United States Patent Office 3,641,043
Patented Feb. 8, 1972

3,641,043
N-(1,3-THIAZOL-2-YL)-DITHIOCARBAMIC ACID DERIVATIVES
Erich Däbritz and Werner Schäfer, Leverkusen, Ferdinand Grewe, Burscheid, and Hans Scheinpflug, Leverkusen, Germany, assignors to Farbenfabriken Bayer Aktiengesellschaft, Leverkusen, Germany
No Drawing. Filed Feb. 14, 1969, Ser. No. 799,517
Claims priority, application Germany, Mar. 2, 1968,
P 16 70 993.6
Int. Cl. C07d 91/34
U.S. Cl. 260—306.8      2 Claims

ABSTRACT OF THE DISCLOSURE

N-(1,3-thiazol-2-yl)-dithiocarbamic acid derivatives, i.e. N-(1,3-thiazol-2-yl)-dithiocarbamic acid -alkyl, -alkali metal carboxy-methyl, -carboxy-methyl, -carboalkoxy-methyl, -N'-aminocarbonyl-methyl and -N'-alkylaminocarbonyl-methyl, esters, which possess fungicidal properties and which may be produced by conventional methods.

---

The present invention relates to and has for its objects the provision for particular new N-(1,3-thiazol-2-yl)-dithiocarbamic acid derivatives, i.e. N-(1,3-thiazol-2-yl)-dithiocarbamic acid -alkyl, -alkali metal carboxy-methyl, -carboxy-methyl, -carboalkoxy-methyl and -N'-alkylaminocarbonyl-methyl, esters, which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

It is known that certain dithiocarbamic acid derivatives can be used as fungicides, for example zinc dimethyldithiocarbamate (A) (compare U.S. Pat. 1,972,961) and the ethoxycarbonylmethyl ester of N,N-dimethyldithiocarbamic acid (B)—(compare German published Pat. 1,017,405). Zinc ethylene-bis-dithiocarbamate has attained worldwide importance in this respect.

It has been found in accordance with the present invention that the particular new N-(1,3-thiazol-2-yl)-dithiocarbamic acid derivatives, i.e. esters, of the formula

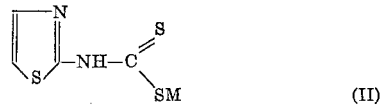

(I)

in which:

R is $C_{1-4}$ alkyl or the group

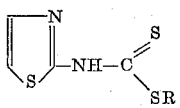

in which:

X is —OM—, —OR' or —NHR', and in which:

M is an equivalent of alkali metal, i.e. alkali metal cation, and
R' is hydrogen or $C_{1-4}$ alkyl, exhibit strong fungicidal properties.

It has been furthermore found in accordance with the present invention that a process may now be provided for the production of such 1,3-thiazolyl-2-dithiocarbamic acid derivatives of the Formula I above which comprises reacting a salt of N-(1,3-thiazol-2-yl)-dithiocarbamic acid of the formula

(II)

in which M is the same as defined above, or an equivalent of an alkaline earth metal cation, with a halogen compound of the formula Hal—R      (III)

in which R is the same as defined above and Hal is a halogen atom such as chloro, bromo, fluoro or iodo.

Surprisingly, the N-(1,3-thiazol-2-yl)-dithiocarbamic acid derivatives of the present invention show a considerably higher fungicidal activity than the previously known, chemically similar dithiocarbamic acid derivatives. Furthermore, the instant compounds are, surprisingly, substantially less phytotoxic than the previously known compounds such as the ethoxycarbonylmethyl ester of N,N-dimethyl-bis-dithiocarbamic acid (B). Therefore, the instant compounds represent a valuable enrichment of the art.

If potassium N-(1,3-thiazol-2-yl)-dithiocarbamate and ethyl α-monochloroacetate are used as starting materials, the course of the reaction can be represented by the following reaction mechanism:

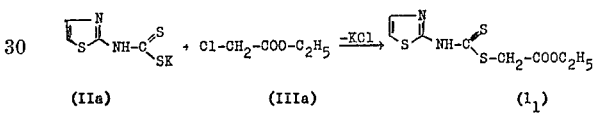

(IIa)      (IIIa)      ($I_1$)

Advantageously, in accordance with the present invention, in the various formulae set forth herein:

R represents lower alkyl hydrocarbon of 1–4 carbon atoms, such as methyl, ethyl, n- and iso-propyl, n-, iso-, sec.- and tert.-butyl, and the like, i.e. $C_{1-4}$ alkyl, especially $C_{1-2}$ alkyl; or the group —$CH_2$—CO—X, in which:

X represents —OM, —OR', or —NHR', in which

M represents an equivalent of alkali metal such as Na, K, and the like, especially Na; and R' represents lower alkyl hydrocarbon of 1–4 carbon atoms such as methyl to tert-butyl inclusive, as defined above.

Preferably, R is $C_{1-2}$ alkyl or the group —$CH_2CO$—X, X is —OM, —OR' or —NHR', M is Na, and R' is hydrogen or $C_{1-4}$ alkyl.

In particular, R is $C_{1-4}$ or $C_{1-2}$ alkyl; —$CH_2$—COO— alkali metal (especially Na); —$CH_2$—COOH;

—$CH_2$—COO—$C_{1-4}$ or $C_{1-2}$ alkyl; or —$CH_2$—CO—NH—$C_{1-4}$ or $C_{1-2}$ alkyl. Thus, the compounds include N-(1,3-thiazol-2-yl)-dithiocarbamic acid-$C_{1-4}$ or $C_{1-2}$ alkyl ester, -alkali metal carboxymethyl ester, -carboxymethyl ester, -carbo-$C_{1-4}$ or $C_{1-2}$ alkoxymethyl ester, and —N'-$C_{1-4}$ or $C_{1-2}$ alkylaminocarbonylmethyl ester.

The halogen compounds usable as starting materials are clearly characterized by Formula III above.

Examples of such halogen compounds which can be used as starting materials, are: methyl chloride, bromide or iodide, ethyl chloride, bromide or iodide, n-propyl chloride, isopropyl chloride, isopropyl iodide, n-butyl or t-butyl chloride or bromide, 2-chlorobutane, 1-chloro-2-methyl propane, and the like; halocarboxylic acids, such as for example monochloracetic acid, as well as their sodium and potassium salts and the like; esters of halocarboxylic acids, such as, for example, methyl chloroacetate, ethyl chloroacetate, ethyl bromoacetate, isopropyl chloroacetate, n-butyl chloroacetate, and the like; and halocarboxylic acid amides, such as for example monochloroacetamide, N-methyl-monochloroacetamide, and the like.

The salts of N-(1,3-thiazol-2-yl)-dithiocarbamic acid usable as starting materials are clearly characterized by Formula II above.

Such starting salts of N-(1,3-thiazol-2-yl)-dithiocarbamic acid have not yet been published, but can be prepared by reacting 2-aminothiazole with carbon disulfide and hydroxides of monovalent or divalent cations, such as KOH, NaOH or Ca(OH)$_2$, in an inert organic solvent, preferably in anhydrous dimethyl formamide or dimethyl sulfoxide, at a temperature of 0 to 150° C., preferably 15 to 40° C., to give the desired dithiocarbamate, and precipitating this by addition of a second inert organic solvent suitable for this purpose, for example ethyl acetate, and then effecting isolation in the usual manner.

As diluents for the production process according to the present invention, water and/or organic solvents are suitable. Preferred organic solvents are, for example methanol, ethanol, isopropanol, cyclohexanol; ketones, such as acetone, methylethyl ketone, methylbutyl ketone or cyclohexanone; ethers, such as diisopropyl ether, dioxan, tetrahydrofuran; hydrocarbons, such as light petroleum, white spirit, hexane, cyclohexane, benzene, toluene, xylene; or chlorinated hydrocarbons, such as methylene chloride, ethylene chloride, chloroform, carbon tetrachloride, chlorobenzene; and, furthermore, dimethyl formamide or dimethyl sulfoxide; and the like.

The reaction temperature can be varied within a fairly wide range. In general, the work is carried out at substantially between about 0–200° C., preferably between about 20 to 120° C.

The reaction takes place preferably at normal pressure. However, if desired, higher pressures, for example up to 50 atmospheres, may be used.

When carrying out the production process according to the present invention, the reaction components are, in general, used in equimolar amounts. It is also possible to work with an excess of, e.g., up to about 30% of one of the components. The duration of the reaction is, in general, 1 to 50 hours, preferably 1 to 24 hours. Working up takes place in the usual manner, for example by separation of the precipitated end product according to the invention or by taking up the precipitate in the organic solvent used for the reaction, the inorganic halides formed during the reaction either remaining in the aqueous phase, if water was added as solvent in the reaction, or, if desired, being precipitated and then separated in the usual manner if exclusively organic solvents were used in which the said inorganic halides are insoluble.

Advantageously, the active compounds according to the present invention exhibit a strong fungicidal activity and are distinguished by a broad spectrum of activity. Their very low toxicity to warm-blooded animals and their good compatibility with higher plants permits the use of the instant compounds as plant protection agents against fungal plant diseases. In the concentrations necessary for the control of fungi, the instant compounds do not damage cultivated plants. Fungitoxic agents in plant protection are used for the control of fungi from the most diverse classes, such as Archimycetes, Phycomycetes, Ascomycetes, Basidiomycetes and *Fungi imperfecti*.

The active compounds according to the invention can be used against parasitic fungi on above-the-soil parts of plants, fungi causing tracheomycosis, fungi which attach the plant from the soil, and seed-borne fungi as well as soil-inhabiting fungi. These groups include for example the Phytophthora species, Peronospora species, Venturia species, Alternaria species, *Botrytis cinerea* and Septoria species as well as various Fusarium fungi; and the like.

The instant active compounds have given very favorable results, in among other things, the control of blight in the case of potatoes and tomatoes (*Phytophthora infestans*) as well as various diseases of rice. They show a markedly good activity against the fungi *Piricularia oryzae, Cochliobolus miyabeanus, Mycosphaerella musicola, Cercospora personata, Botrytis cinerea*; and the like.

The active compounds according to the instant invention can be utilized, if desired, in the form of the usual formulations or compositions with conventional inert pesticidal diluents or extenders, i.e. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid), silicates (e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ether, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, or herbicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.001–5%, preferably 0.001–0.2%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95%, and preferably 0.001–90%, by weight of the mixture.

The active compound can also be used in accordance with the well known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound, or even the 100% active substance alone, e.g. about 20–100% by weight of the active compound.

In particular, the present invention contemplates methods of selectively killing, combating or controlling fungi, which comprise applying to at least one of (a) such fungi and (b) their habitat, i.e. the locus to be protected, a fungicidally effective or toxic amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, squirting, and the like.

It will be realized, of course, that the concentration of the particular active compound utilized in admixture with the carrier vehicle will depend upon the intended application. Therefore, in special cases, it is possible to go above or below the aforementioned concentration ranges.

The fungicidal effectiveness of the particular new compounds of the present invention is illustrated, without limitation, by the following examples.

EXAMPLE 1

Piricularia test: liquid preparation of active compound

Solvent: 4 parts by weight acetone
Dispersing agent: 0.05 part by weight sodium oleate
Other additive: 0.2 part by weight gelatin
Water: 95.75 parts by weight The amount of the particular active compound required for the desired final concentration in the spray liquor is mixed with the stated amount of solvent, and the resulting concentrate is diluted with the stated amount of water containing the stated dispersing agent and other additive.

30 rice plants about 14 days old are sprayed (i.e. treated) with the active compound-containing spray liquor until dripping wet. The plants remain in a greenhouse at temperatures of 22 to 24° C. and a relative atmospheric humidity of about 70% until they are dry. The plants are then inoculated with an aqueous suspension of 100,000 to 200,000 spores/ml. of *Piricularia oryzae* and placed in a chamber at 24–26° C. and 100% relative atmospheric humidity.

5 days after inoculation, the infestation of all the leaves present at the time of inoculation is determined as a percentage of the untreated but also inoculated control plants. 0% means no infestation; 100% means that the infestation is exactly as great as in the case of the control plants.

The particular active compounds tested, their concentrations, and the results obtained can be seen from the following Table 1.

TABLE 1.—PIRICULARIA TEST/LIQUID PREPARATION OF ACTIVE COMPOUND

| Active compound | Infestation as a percentage of the infestation of the untreated control with a concentration of active compound (in percent) of— | |
|---|---|---|
| | 0.05 | 0.025 |
| (A) $CH_3\!\!>\!\!N-C-S-Zn-S-C-N\!\!<\!\!CH_3$ with $\|S$ and $CH_3$ groups (known) | 25 | 75 |
| ($1_2$) thiadiazole-NH-C(=S)-S-CH$_2$-COOC$_2$H$_5$ | 0 | 0 |
| ($2_1$) thiadiazole-NH-C(=S)-S-CH$_2$-COOC$_4$H$_9$-n | 0 | 0 |
| ($3_1$) thiadiazole-NH-C(=S)-S-CH$_2$-COOH | 0 | 0 |
| ($4_1$) thiadiazole-NH-C(=S)-S-C$_2$H$_5$ | 0 | 13 |
| ($5_1$) thiadiazole-NH-C(=S)-S-CH$_2$-C(=O)ONa | 0 | 0 |

EXAMPLE 2

Phytophthora test

Solvent: 4.7 parts by weight acetone
Dispersing agent: 0.3 part by weight alkylaryl polyglycol ether
Water: 95 parts by weight The amount of the particular active compound required for the desired final concentration of such active compound in the spray liquid is mixed with the stated amount of solvent and the resulting concentrate is diluted with the stated amount of water which contains the stated dispersing agent.

Young tomato plants (Bonny best) with 2–6 foliage leaves are sprayed (i.e. treated) with the active compound-containing spray liquid until dripping wet. The plants remain in a greenhouse for 24 hours at 20° C. and at a relative atmospheric humidity of 70%. The tomato plants are then inoculated with an aqueous suspension of spores of *Phytophthora infestants*. The plants are brought into a moist chamber with an atmospheric humidity of 100% and a temperature of 18–20° C.

After 5 days the infestation of the tomato plants is determined as a percentage of the untreated but also inoculated control plants: 0% means no infestation; 100% means that the infestation is exactly as great as in the case of the control plants.

The particuar active compounds tested, their concentrations, and the results obtained can be seen from the following Table 2:

TABLE 2.—PHYTOPHTHORA TEST

| Active compound | Infestation as a percentage of the infestation of the untreated control with a concentration of active active compound (in percent of— | |
|---|---|---|
| | 0.025 | 0.0062 |
| (A) $\begin{array}{c}CH_3\\ \phantom{C}\backslash\\ \phantom{CH}N-C-S-Zn-S-C-N\\ \phantom{CH_3}/\phantom{C} \phantom{--} \|\phantom{----}\|\phantom{---} \backslash\\ CH_3\phantom{--}S\phantom{----}S\phantom{---}CH_3\end{array}$ (known) | 52 | 61 |
| (B) $\begin{array}{c}CH_3\phantom{--}S\phantom{-------}O\\ \phantom{CH}\backslash\phantom{-}\|\phantom{------}\|\\ \phantom{CH}N-C-S-CH_2-C\\ \phantom{CH_3}/\phantom{-----------}\backslash\\ CH_3\phantom{-----------}O-C_2H_5\end{array}$ (known) | 100 | (¹) |
| (1₃) thiazole-NH-C(=S)-S-CH₂-COOC₂H₅ | 0 | 1 |
| (2₂) thiazole-NH-C(=S)-S-CH₂-COOC₄H₉-n | 0 | 4 |
| (3₂) thiazole-NH-C(=S)-S-CH₂-COOH | 0 | 21 |
| (4₂) thiazole-NH-C(=S)-S-C₂H₅ | 24 | |
| (5₂) thiazole-NH-C(=S)-S-CH₂-C(=O)-ONa | 0 | |
| (6₁) thiazole-NH-C(=S)-S-CH₂-C(=O)-NH-CH₃ | 10 | |

¹ Plants greatly damaged.

The following further examples illustrate, without limitation, the process for producing the particular new compounds of the present invention.

EXAMPLE 3

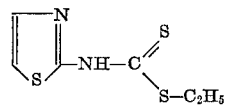
(4₃)

(a) 10.7 g. (50 millimols) potassium N-(1,3-thiazol-2-yl)-dithiocarbamate are dissolved in 200 ml. of boiling methanol, and 6.05 g. (55 millimols) ethyl bromide are added. After half an hour, crystallization commences in the initially homogeneous solution. After standing for 48 hours, suction filtration is effected followed by washing with water to remove the formed KBr and drying of the remaining precipitate. 9.8 g. (96% of the theory) of yellow needles of N-(1,3-thiazol-2-yl)-dithiocarbamic acid ethyl ester are obtained: M.P. 157–160° C. Recrystallization from isopropanol gives a product of M.P. 158–160° C. (felted yellow needles).

(b) The potassium salt of N-(1,3-thiazol-2-yl)-dithiocarbamic acid used as starting material is obtained according to the following procedure:

100 g. (1 mol) 2-aminothiazole are dissolved in 500 ml. dimethyl formamide, and 56 g. (1 mol) KOH (tablets) are added. 76 g. (1 mol) of carbon disulfide are then added dropwise to the suspension within 15 minutes, at a maximum of 35° C. (occasional ice cooling). The KOH dissolves; a flocculent precipitate then forms in the deep-red solution, which precipitate dissolves during subsequent stirring. The mixture remains standing for about 12 hours. The dithiocarbamate is precipitated from the red, homogeneous reaction solution by slow addition of 2 liters of ethyl acetate (added dropwise over about 2½ to 3 hours). The silky-lustrous precipitate is filtered off with suction and washed thoroughly with ethyl acetate until the product appears pale-yellow.

After drying in a vacuum, 189.8 g. (88.6% of the theory) of potassium N - (1,3-thiazol-2-yl)-dithiocarbamate are obtained; M.P. 228–233° C. (decomp.). After recrystallization several times from acetone, M.P. 236–237° C.

EXAMPLE 4

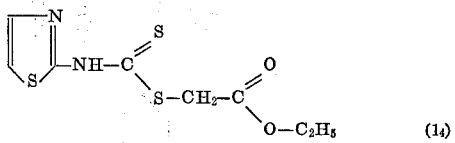 (1₄)

12.3 g. (0.1 mol) ethyl α-monochloroacetate are added to a suspension of 21.4 g. (0.1 mol) potassium N-(1,3-thiazol-2-yl)-dithiocarbamate in 60 ml. isopropanol and heated to reflux temperature (85° C.) for 1 hour. After standing for 12 hours, the precipitate is filtered off with suction and washed with water until the filtrate is free from chloride. After drying, 24.4 g. (93% of the theory) of the carbethoxymethyl ester of N-(1,3-thiazol-2-yl)-dithiocarbamic acid are obtained which, after recrystallization from 750 ml. methanol, gives small, yellow, wadding-like needles of M.P. 164–165° C.

EXAMPLE 5

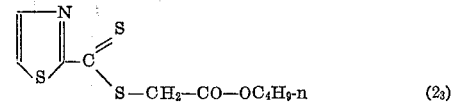 (2₃)

15.1 g. (0.1 mol) n-butyl α-chloracetate are added to 21.4 g. (0.1 mol) potassium N-(1,3-thiazol-2-yl)-dithiocarbamate suspended in 60 ml. isopropanol, and the mixture is boiled at 83° C. for 3 hours. After standing at room temperature for 12 hours, the residue is filtered off and washed with water until the wash water is free from chloride. After drying, 15 g. (52% of the theory) of N-(1,3-thiazol-2-yl)-dithiocarbamic acid carbo-n-butoxymethyl ester, M.P. 129–131° C., are obtained. After recrystallization from ethyl alcohol, yellow crystals of M.P. 131.5–133.5° C., are obtainable.

EXAMPLE 6

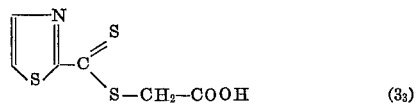 (3₃)

A solution of 42.7 g. (0.45 mol) monochloroacetic acid in 125 ml. water is added dropwise at room temperature to a solution of 94.5 g. (0.44 mol) potassium N-(1,3-thiazol-2-yl)-dithiocarbamate in 300 ml. of water. After standing for at least 12 hours, the yellow crystalline precipitate is filtered off with suction, washed free from chlorine with a large quantity of water, and dried over $CaCl_2$. 83 g. (=80% of the theory) carboxymethyl ester of N-(1,3-thiazol-2-yl)-dithiocarbamic acid, M.P. 186–192° C., are obtained; recrystallized from dioxan: M.P. 182–183° C. (from $HCl/H_2O$ (1:1) M.P. 190–195° C.).

EXAMPLE 7

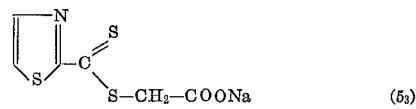 (5₃)

A solution [neutralised with 5 g. (0.125 mol) NaOH dissolved in 13 ml. water ] of 11.9 g. (0.125 mol) chloroacetic acid in 30 ml. water is added dropwise in 15 minutes to a solution of 26.8 g. (0.125 mol) potassium N-(1,3-thiazol-2-yl)-dithiocarbamic acid in 125 ml. water (temperature increases from 23 to 27° C.). After standing for 12 hours, the yellow precipitate is filtered off with suction and dried over calcium chloride in a vacuum. The yield is 20 g. (=78% of the theory) of the sodium carboxymethyl ester of N-(1,3-thiazol - 2 - yl)-dithiocarbamic acid; M.P. 270–275° C. (decomp.).

The corresponding sodium compound may also be obtained when the acid described in Example 6 is reacted in the conventional manner (i.e. hydrolyzed) with the equimolar amount of sodium hydroxide.

EXAMPLE 8

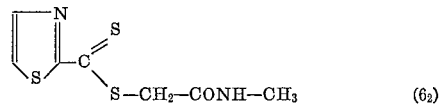 (6₂)

10.8 g. (0.1 mol) N-methyl-α-chloroacetamide, dissolved in 35 ml. water, are added to a solution of 21.4 g. (0.1 mol) potassium N-(1,3-thiazol - 2 - yl) - dithiocarbamate in 100 ml. water (temperature increases to 30° C.). a yellow precipitate being formed after initial turbidity. After standing for 20 hours, suction filtration is effected, followed by thorough washing with water and drying over $CaCl_2$. 17.6 g. (71% of the theory) of N-(1,3-thiazol-2-yl)-dithiocarbamino-N'-methyl-acetamide, i.e. N-(1,3-thiazol-2-yl) - dithiocarbamic acid - N' - methyl - aminocarbonylmethyl ester, M.P. 164–166° C., recrystallized from methanol M.P. 169–171° C., are obtained.

It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with warm-blooded creatures and plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention.

What is claimed is:

1. N-(1,3-thiazol-2-yl)-dithiocarbamic acid ester of the formula

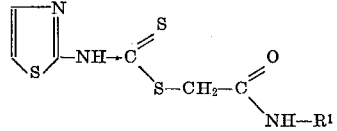

in which R is alkyl of 1–4 carbon atoms.

2. Ester according to claim 1 wherein such compound is N - (1,3 - thiazol - 2 - yl) - dithiocarbamic acid-N'-methyl-amino-carbonylmethyl ester of the formula
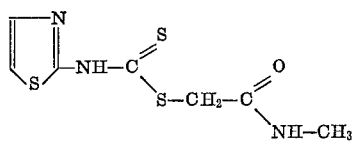
References Cited
UNITED STATES PATENTS
2,839,404   6/1958   Knott _____ 260—306.8
OTHER REFERENCES
Zsolnai, Arzne-Mittel Forsch, 16 (8), 1092–99, 1966.
ALEX MAZEL, Primaray Exminer
R. J. GALLAGHER, Assistant Examiner
U.S. Cl. X.R.
424—270